United States Patent [19]

Kromer et al.

[11] 4,033,557
[45] July 5, 1977

[54] METHOD OF RECOVERY OF MATERIAL TEST SAMPLES

[75] Inventors: Heiner M. Kromer, New York, N.Y.; John Ossman, Clifton, N.J.

[73] Assignee: Haake, Inc., Saddle Brook, N.J.

[22] Filed: Aug. 2, 1976

[21] Appl. No.: 710,795

[52] U.S. Cl. .................................. 259/192; 73/59
[51] Int. Cl.[2] .......................................... B29B 1/06
[58] Field of Search .............. 73/59, 56, 64.1, 15.4; 259/191, 192, 193, 5, 6, 21, 41, 104; 425/201, 206, 207

[56] References Cited

UNITED STATES PATENTS

| | | | |
|---|---|---|---|
| 3,279,240 | 10/1966 | Kowalski | 73/15.4 |
| 3,479,858 | 11/1969 | Masashi | 73/15.6 |
| 3,749,375 | 7/1973 | Hermann | 259/192 |
| 3,764,114 | 10/1973 | Ocker | 259/192 |
| 3,800,597 | 4/1974 | Paul | 73/59 |

*Primary Examiner*—Robert W. Jenkins
*Attorney, Agent, or Firm*—Silverman and Jackson

[57] ABSTRACT

The present method of test sample recovery comprises the steps of: placement of granulated solid material within a multi-chambered, multi-sectioned apparatus having an angulated interior surface; rotatably mixing the material of said sample through the use of rotors axially disposed within the chambers of the apparatus wherein the exterior surface of said rotors exhibits an angulation which is opposite in slope to the angulation of the interior surface of the mixing chambers; maintaining a constant pressure level within the chambers; controllably heating the material of the sample until a state of flux is obtained; monitoring the viscosity of the sample in order to ascertain the point at which cross-linking is attained; continuing the above steps until a hardened solid-state is reached; opening of the test chamber; and removing the hardened test sample which, by virtue of said opposing angulations of the test chambers and rotors, imparts to the cross-linked sample a self-releasing physical characteristic which enables the sample to become readily separated from the walls of the mixer and surfaces of the rotor without damage to either the sample or to the mixing apparatus.

3 Claims, 5 Drawing Figures

METHOD OF RECOVERY OF MATERIAL TEST SAMPLES

REFERENCE TO RELATED APPLICATION

This application is a companion application to Ser. No. 713,627, filed Aug. 11, 1976, entitled "Three-Sectioned Mixer Having Individual Thermal Controls," filed on like date of the present case.

BACKGROUND OF THE INVENTION

A long-standing problem in the testing of characteristics of thermo-plastic materials has related to the recovery of a sample which has been mixed under conditions intended to simulate those encountered during production. In such testing, it is of course desired that the sample not be materially altered or affected during the process of its removal from the test chamber.

In the past, test apparatus for thermoplastic material have not been adapted to ease of removability of the sample, or to ease of reproduceability of such samples. Accordingly, efforts in securing adequate quality control over various extrusion and other plastic-forming processes have been encumbered by the tendency of the plastic materials to resist removal from such prior art test chambers.

More particularly, a typical prior art mixer would consist of a mixing chamber in which counter-rotating rotors impact against granules of the test material, thus involving pressure against the walls of the mixing chamber and within the test material. Such mixers are usually thermal-liquid heated and consist of a bowl and backstand. The backstand is generally equipped with a plurality of gears which serve to drive the rotors as well as to regulate their rate of rotation.

After the test material is introduced into the mixer bowl, it is heated and mixed until fluxing occurs, this will produce various shear processes which are a result of the physical and chemical effects of the conditions of heat and pressure occurring by virtue of the mixing.

The measuring objective of such testing is to monitor the time span during which the material possesses its lowest viscosity, that is, the period prior to cross-linking. This time span is of significance in the optimization of process-conditions during extrusion, injection molding, lamination and other procedures.

The construction of commonly available mixers requires that the rotors rotate sufficiently long until the cross-linking or setting of the thermoplastic material occurs; however, in this approach, the rotating force of the rotors will often mechanically impair or destroy the sample, often reducing it to powder form. Thus, all that is often left to test, is a pulverized sample. Further, even where such pulverization does not normally occur, the full or partial impairment of the thermo-set physical structure of the sample is often unavoidable in order to effectuate its removal from the mixer bowl and to permit essential cleaning of the bowl, rotors and backstand so that the apparatus can be reused for future tests.

On occasion, the material may cure or harden within the bowl to such an extent that its removal is impossible without forcibly hammering or chiseling the sample out. Obviously, such an approach not only impairs the physical characteristics of the sample, but also can cause substantial harm to the test apparatus which may be formed of stainless steel and/or other material sensitive to abrasion and injury. Accordingly, it may be appreciated that such a procedure for obtaining thermoplastic samples has become a major drawback in the perfection of various plastic-forming processes.

It is to be further noted that the instant problem has related not only to thermosetting problems in plastics, but also to those involving other materials such as fiberglass, clays, asbestos, quartz-base materials, and wood-related materials. Such materials often have strong abrasive properties and have presented problems in the damaging of test apparatus.

Hence, it is to be appreciated that a problem has long existed with respect to test reproduceability and correlation of material samples.

Thusly, the present inventive method may be viewed as a solution to this long-standing problem.

SUMMARY OF THE INVENTION

The present method of test sample recovery comprises the steps of: placement of granulated solid material within a multi-chambered, multi-sectioned apparatus having an angulated interior surface, rotatably mixing the material of said sample through the use of rotors axially disposed within the chambers of the apparatus wherein the exterior surface of said rotors exhibits an angulation which is opposite in slope to the angulation of the interior surface of the mixing chambers; maintaining a constant pressure level within the chambers; controllably heating the material of the sample until a state of flux is obtained; monitoring the viscocity of the sample in order to ascertain the point at which cross-linking is attained; continuing the above steps until a hardened solid-state is reached; opening of the test chamber; and removing the hardened test sample which, by virtue of said angulations of the test chambers and rotors, imparts to the cross-linked sample a self-releasing physical characteristic which enables it to become readily separated from the walls of the mixer and surfaces of the rotor without damage to either the sample or to the mixing apparatus.

Accordingly, it is an object of the present invention to provide an improved method of recovery of material test samples.

It is a further object to provide an improved method of test-sample recovery having particular applicability to cross-linking polymeric materials.

DETAILED DESCRIPTION OF THE INVENTION

In order to fully understand the present invention, it is necessary to appreciate the physical and chemical processes which, is the intent of the present invention, to appropriately monitor and examine the results thereof.

Figure 1:
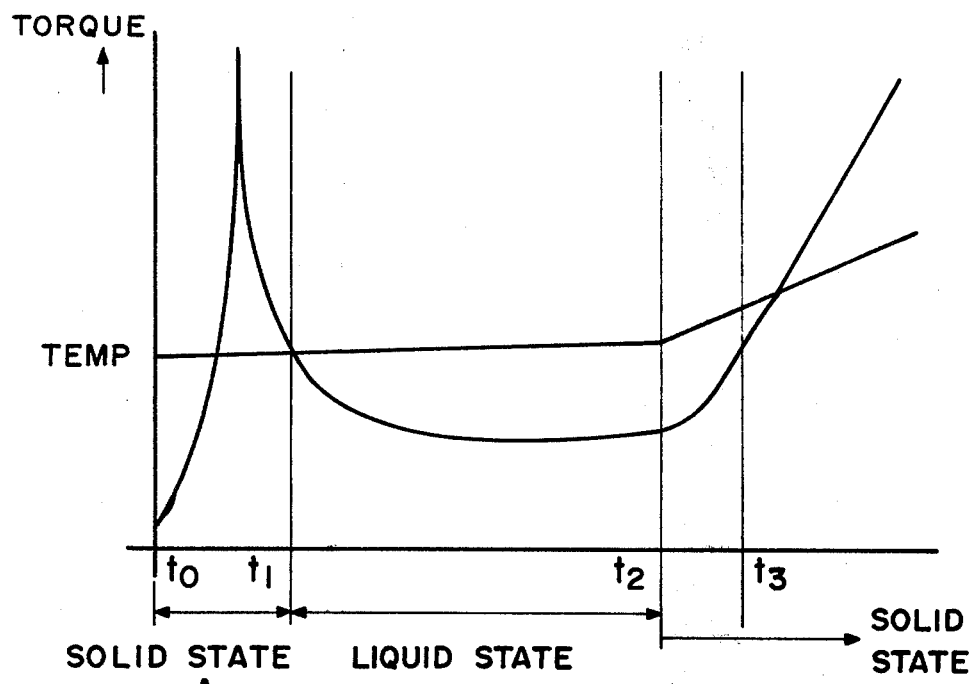
FIG. 1 is a graph illustrating (within a mixing chamber) temperature and torque as a function of time.

With reference to FIG. 1, it is noted that there are three essential parameters of concern, namely, temperature, shear forces or torque, and time. In FIG. 1, temperature and torque are expressed as a function of time.

Figure 4:
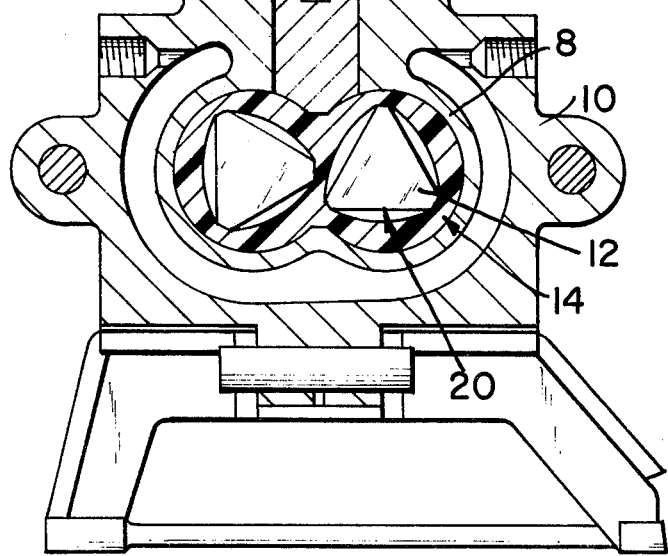
FIG. 4 is a cross-sectional schematic view of one embodiment of a mixer which may be utilized in association with the present method.

The time-frame prior to T-O relates to that period during which granulated solid material 8, in solid-state A, is placed within a multi-chamber, multi-sectioned apparatus 10 (See FIG. 4) in which conditions of pressure and heat can be appropriately controlled. At point T-O, application of pressure, through the use of one or more different types of rotors 12, is instituted. Also, a temperature level is initiated which, it will be noted, remains relatively constant until point T-2. The material 8 will start to melt upon application of temperature and pressure at point T-O. During the time-frame T-O to T-1, the pressure of the rotors 12 against the material, as denoted by the torque curve, increases steadily until the solid-state A is essentially broken down and a liquid state is attained at point T-1.

During the period from T-1 to T-2, while the material is in liquid or viscous state, fundamental changes, within the intra-and inter-molecular structure of the material will occur.

Point T-2 indicated the point at which, in thermoplastic materials, cross-linking occurs. In physical terms, the point of cross-linking indicates a return to a solid-state B. As this occurs, the force encountered by the turning of the rotor will increase sharply. Also, temperature will begin to rise. The point in the neighborhood of T-3 corresponds to the post cross-linking period during which hardening of the material into the solid-state B occurs. Shortly following T-3, the rotors are turned off in order to permit the material to harden into its finalized form.

Figure 2:
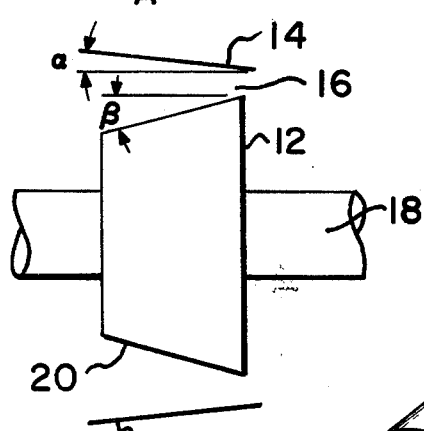
FIG. 2 is a schematic illustration showing the relative angulations of the rotor and the inner surface of a mixing chamber.

Following the hardening of the material within the test chamber, the release problem, as elaborated upon the Background of the Invention, is typically encountered. The situation is schematically illustrated in FIG. 2, in which is shown an interior wall 14 of one chamber 16 of the test apparatus. Within the chamber is a rotor 12 which is driven by a shaft 18. The inner well 14 is provided with an angulation or angle of alpha degrees with respect to the horizontal. In combination with said angulation, the surface 20 of the rotor 12 is provided with an angulation or angle bata having a slope which is opposite in direction to the slope of said angle alpha. The preferred range of angles of said angle alpha lies between one degree and four degrees, and of said angle bata between one degree and four degrees.

Figure 5:
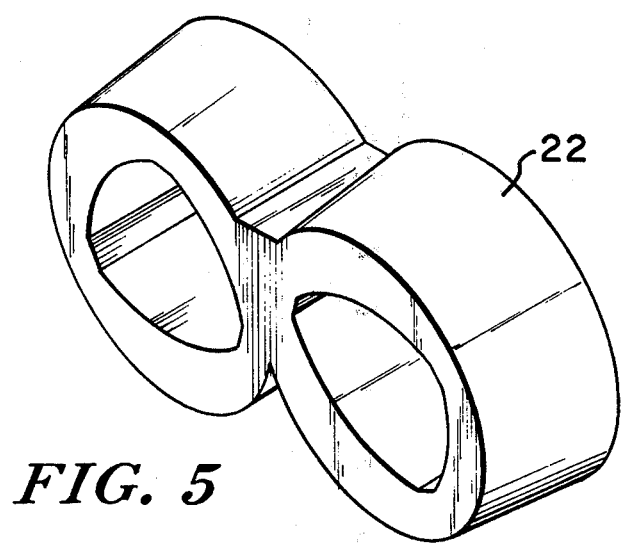
FIG. 5 is a perspective view of a sample obtained by the present inventive method.
Figure 3:
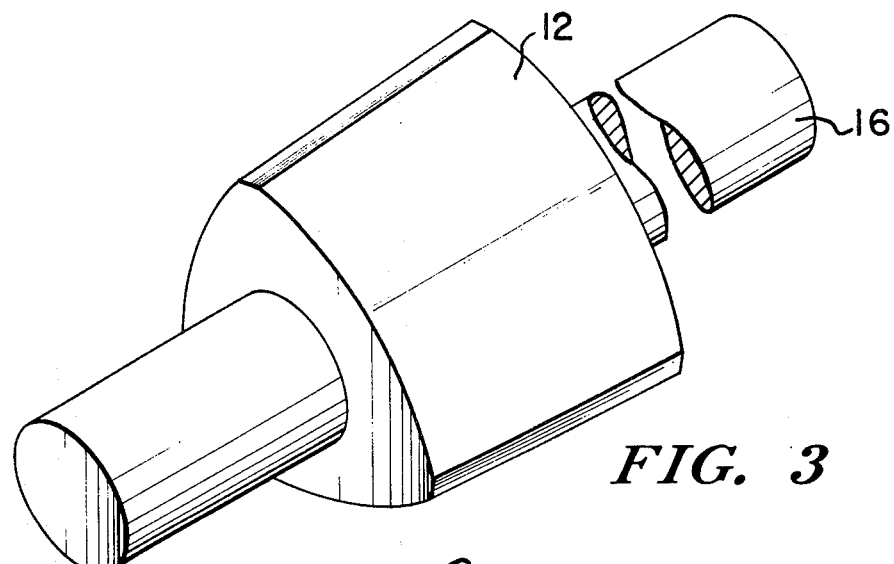
FIG. 3 is a perspective view of one embodiment of a rotor which may be utilized in the present method.

It has been discovered that the provision of relative opposing angulation of surfaces 14 and 20 permits the hardened test material 22 to become readily released or freed from the test chamber. When such a release occurs, a test sample, shown in representative form in FIG. 5, is obtained.

Accordingly, the present inventive method has demonstrated utility attendant to the provision of opposing angulations of the surface of adjacent mixing elements, that is, the interior test chamber and the mixing rotor. Thus, it is seen that the objects set forth in the Summary of the Invention are effectively attended by the method as above described.

While there have been herein shown and described the preferred embodiments of the present invention, it will be understood that the invention may be embodied otherwise than as herein specifically illustrated or described and that within said embodiments certain changes in the detail and construction, and the form or arrangement of the parts may be made without departing from the underlying idea or principles of this invention within the scope of the appended claims.

What is claimed is:

1. A method of recovery of material test samples, comprising the steps of:
   a. placement of granulated solid material within a multi-sectioned apparatus having an angulated interior surface;
   b. rotatably mixing the material of said sample through the use of rotors axially disposed within the chambers of the apparatus wherein the exterior surface of said rotors exhibits an angulation which is opposite in slope to the angulation of the interior surface of mixing chambers;
   c. controllably heating the material of the sample until a state of flux is obtained;
   d. monitoring the viscosity of the sample in order to ascertain the point at which cross-linking is attained;
   e. continuing the above steps until a hardened solid-state is reached;
   f. opening of the test chamber; and
   g. removing the hardened test sample which, by virtue of said opposing angulations of the test chambers and rotors, imparts to the cross-linked sample a self-releasing physical characteristic which enables it to become readily separated from the walls of the mixer and surfaces of the rotor without damage to either the sample or to the mixing apparatus.

2. The method as recited in claim 1 in which said method includes the step of maintaining a constant pressure level within the chamber.

3. The method as recited in claim 1 in which said method further includes the step of maintaining a homogenous thermal configuration throughout the test material during all phases of mixing.

* * * * *